April 20, 1971          L. L. FLECK          3,575,790

FOG RESISTANT GLASS WITH WATER INSOLUBLE POLYVINYL ALCOHOL FILM

Filed Sept. 15, 1967

INVENTOR.
BY Lawrence L. Fleck

George A. Growe
ATTORNEY

United States Patent Office 3,575,790
Patented Apr. 20, 1971

3,575,790
FOG RESISTANT GLASS WITH WATER INSOLUBLE POLYVINYL ALCOHOL FILM
Lawrence L. Fleck, Warren, Mich., assignor to General Motors Corporation, Detroit, Mich.
Filed Sept. 15, 1967, Ser. No. 667,982
Int. Cl. B32b *17/10*
U.S. Cl. 161—203                                                2 Claims

ABSTRACT OF THE DISCLOSURE

A window, lens or other optical device comprised of a transparent body member, such as glass, and a coextensive transparent polyvinyl alcohol based film, wherein up to about 35% of the hydroxyl groups of the polyvinyl alcohol have reacted with another composition such that the film is substantially water insoluble, applied to a surface of the transparent body member will retard the formation of frost or fog on the coated surface of the body member.

---

Figure 1:
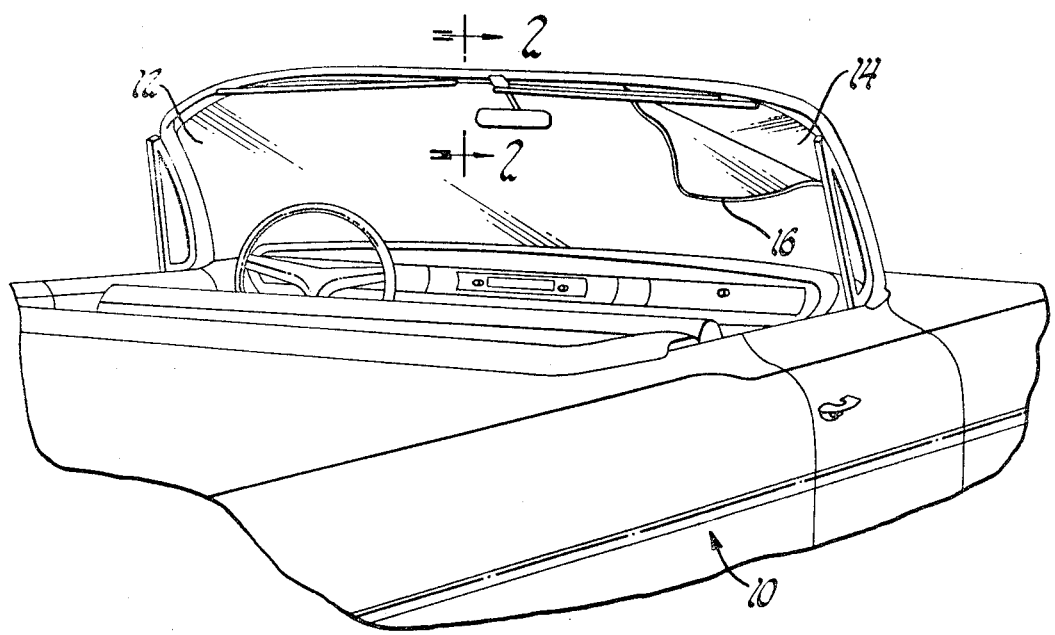

This invention is related to the design of transparent optical members such as windows, lenses and the like which are exposed to conditions of humidity and temperature so that under normal circumstances fogging and/or frosting of a surface of the member would be experienced. More particularly, this invention relates to a composite optical structure comprised of a conventional transparent body member, such as a glass window pane, upon at least one surface of which a transparent film of a specially treated polyvinyl alcohol resin has been placed. The film is substantially water insoluble but is sufficiently reactive with water to prevent the condensation of moisture as discrete crystals or droplets on the optical surface thereof.

The observation of fogging or frosting of a cold surface which is exposed to warmer and relatively humid air is a common experience. The observed phenomenon is known to be the result of condensation of water upon the cold surface in the form of droplets or crystals depending upon the temperature of the surface. When the surface is part of a glass or plastic article which is intended to be transparent and function as a window, a lens or the like, condensation of moisture thereon distorts or prevents vision through the body. Several different techniques have been used to prevent or remove the condensation of moisture on or from a relatively cold glass surface. For example, films of surface active materials (wetting agents) such as soap, or regenerated cellulose have been employed on the surface of glass windows to prevent the formation of visible masses by causing the droplets to coalesce to a continuous transparent film. However, materials of this type are not effective over long periods of time. Films of such surface active materials are water soluble and readily removed from glass surfaces by condensing moisture or a damp cloth. Regenerated cellulose is unstable to heat, light, and subject to bacterial attack. Cellulose tends to yellow as well as become brittle with age. Moreover, these films generally have poor optical properties whose refractive indexes are quite different from that of plate or automotive glass. Automobile windows are normally defogged or defrosted by blowing warm air from the car heater over the surface thereof to evaporate the condensed moisture. In cold weather the engine must be operated for several minutes before the heater produces hot air suitable for defrosting. When the outside air is quite humid the heated air contains a substantial amount of water which reduces the tendency of condensed moisture to evaporate. Preferably the condensation of moisture is prevented in the first instance.

It is an obect of the present invention to provide a transparent optical member having a water insoluble transparent film of a synthetic polymeric resin upon at least one surface thereof which resists fogging and frosting of the surface.

It is another object of the present invention to provide a transparent, substantially water-insoluble film, formed predominately of the reaction product of polyvinyl alcohol with another composition wherein a minor portion up to about 35% of the hydroxyl groups of the polyvinyl alcohol are chemically combined to reduce the water solubility of the film but to leave unaffected its ability to sorb and desorb water.

It is a still further object of the present invention to provide a method of treating glass windows, lenses and the like so as to retard or eliminate fogging or frosting of the member.

In accordance with this invention, these and other objects are accomplished by preparing a transparent film of chemically modified polyvinyl alcohol resin, preferably of uniform thickness so that the optical properties of the film are not distorted. Commercial polyvinyl alcohol resins frequently contain residual poly(vinyl acetate) since the former are prepared by alcoholysis of the latter. Polyvinyl alcohol resins of this type containing up to 20–25% by weight residual poly(vinyl) acetate) may be employed in accordance with the invention. For convenience, however, these resins will be referred to throughout the specification and claims simply as polyvinyl alcohol. In general, in the practice of the invention of polyvinyl alcohol resin is modified by chain cross linking and/or by chain branching, so as to be substantially water insoluble. The polyvinyl alcohol chains are suitably cross linked by chemical combination with an alcohol or water soluble organic composition containing a plurality of functional groups which are reactive with the hydroxyl groups of the polyvinyl alcohol. Examples of such reactive functional groups are carboxylic acid groups, carbonyl groups such as occur in aldehydes, and hydroxymethyl groups such as occur in derivatives of urea. Two or more of such groups in the same molecule of modifier react under suitable conditions with hydroxyl groups in different polyvinyl alcohol molecules to link the long chain molecules together. Branches may be formed on the polyvinyl alcohol chains by employing compositions which are effectively monofunctional in character with respect to the above-defined groups so as not to cross link the chains.

A mixture of polyvinyl alcohol resin and suitable chemical modifying agent is processed into a film as for example by casting a solution thereof onto a suitable surface and evaporating the solvent. The amount of modifying agent is determined to be that which is chemically equivalent to a minor portion, up to about 35%, of the hydroxyl groups of the polyvinyl alcohol resin. In other words it is intended that no more than about 35% of the available hydroxyl groups be involved in the branching or cross linking reaction. The film is heated whereby the reaction between the polyvinyl alcohol and modifier is completed such that the film is substantially water insoluble. However, while the film is substantially water insoluble it has the ability to sorb water molecules, apparently by hydrogen bonding between the water and the hydroxyl groups, under suitable conditions of temperature and relative humidity. The sorbed water is released by the film when the relative humidity is decreased.

A film of modified polyvinyl alcohol resin prepared in accordance with the invention and applied to a glass surface eliminates or retards fog or frost formation on the coated surface. Under most weather conditions commonly encountered by an automobile, for example, condensation of water in the form of droplets or crystals on the inside surfaces of coated windows is prevented. Moreover, when fogging or frosting does occur under prolonged exposure to high relative humidity, it has been observed that the condensation is more readily dispelled from the film than from untreated window glass. For example, when the film was applied to a portion only of an automobile windshield and deliberately frosted by prolonged exposure to frigid air of 100% relative humidity, the frost was quickly removed from the film coated portion of the window by operation of the automobile defroster, while the frost on the untreated window glass was observed to remain for several minutes thereafter.

Other objects and advantages of the invention will be apparent from a detailed description of the invention, reference being had to the attached drawing depicting a preferred embodiment.

Figure 2:
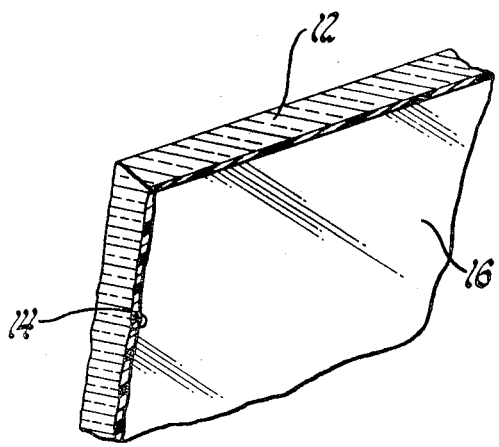

In the drawing:

FIG. 1 is a perspective view of an automobile having the windshield coated on the inside surface with a transparent film prepared in accordance with the invention, and FIG. 2 is a sectional view of the windshield taken along line 2—2 of FIG. 1.

Polyvinyl alcohol is the principal moisture active material in the subject anti-fogging film. It is employed to interact with water molecules in the air to prevent their condensation into visibility-affecting droplets or crystals. This vinyl polymer contains a vast number of closely situated polar hydroxyl groups which are capable of forming intramolecular hydrogen bonds. When liquid water or water vapor comes into contact with the film formed of this polymer, the hydroxyl groups may form hydrogen bonds with water itself. Presumably this interaction between the film and water molecules in the air is instrumental in preventing the formation of visible droplets or crystals. Of course, polyvinyl alcohol itself is well known. Conventionally it is formed by the alcoholysis of poly(vinyl acetate). If the residual poly(vinyl acetate) content is not too high, the resin may be readily dissolved in hot water. A film of unmodified polyvinyl alcohol may be slowly eroded or dissolved by flooding with cold water. However, a polyvinyl alcohol film may be prepared which is suitable for bonding to window glass and the like and which is not readily dissolved by washing with water. Moreover, such a polyvinyl alcohol film will retard fog and frost formation. This is done by modifying polyvinyl alcohol with relatively small amounts of materials which chemically combine with a portion only of the hydroxyl groups of the polyvinyl alcohol. Preferably, these materials are compounds containing a carboxylic acid group or a carbonyl group or hydroxymethyl group which is reactive with a hydroxyl group. Suitable carbonyl groups are found in aldehydes and in certain methylolated heterocyclic derivatives of urea. Monofunctional compounds of this type are employed to form massive side groups which render the polyvinyl alcohol more durable in the presence of water. Polyfunctional compounds are suitable for cross linking the molecular chains of vinyl resin thus rendering the reaction product substantially water insoluble. It is preferred that only a minor portion, up to about 35%, of the hydroxyl groups of the polyvinyl alcohol resin enter into chemical reaction with the modifier. The class of suitable modifiers is further restricted in that the compositions must be reactive with the hydroxyl groups without adversely affecting the optical properties of the film prepared from the modified resin. The operable modifiers must react with the hydroxyl groups of the polyvinyl alcohol at a temperature at which the alcohol is not thermally decomposed. A sufficient quantity of the modifier is employed to reduce the water solubility of the polyvinyl alcohol without materially affecting its ability to sorb and desorb water molecules. Examples of suitable modifiers for the polyvinyl alcohol resin in accordance with the invention include poly(methyl vinyl ether/maleic anhydride), esters and partial esters of poly(methyl vinyl ether/maleic anhydride), glyoxylic acid, glyoxal, water soluble polymeric dialdehydes such as those formed by oxidation of starch with periodic acid and generally described by the structural formula

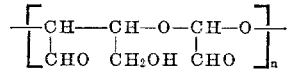

monomethylol dimethyl hydantoin, and 4,5-dihydroxy-1,3-bis(hydroxymethyl)-2-imidazolidinone.

A specific example will further illustrate the practice of the invention. A polyvinyl alcohol resin was employed which contained a 2–4% residual poly(vinyl acetate) by weight and had an average molecular weight of about 88,000. A solution consisting of 8 parts by weight polyvinyl alcohol, 72 parts by weight water, 10 parts by weight normal propyl alcohol and 10 parts by weight isopropyl alcohol was prepared. The solution was heated to 60° C. in a flask equipped with a stirrer, a thermometer, and a reflux condenser. While the warm solution was being stirred, 0.1 gram of tetraethylene glycol and 0.5 gram of a low molecular weight grade of a copolymer of maleic anhydride and methyl vinyl ether was added for each 10 grams of polyvinyl alcohol present in the solution. Specifically, the copolymer was Gantrez AN–119, a product of General Aniline & Film Corp. The contents of the flask were reacted for twenty minutes during which period the anhydride was hydrolyzed with water to form the free acid. Some cross linking of the two polymers through reaction of the carboxyl groups of the acid anhydride and hydroxyl groups is believed to also occur during this preparation of polymer solution. However, for the most part the cross linking occurs when the final film is oven cured as will be described below.

The polymer solution was cooled and four grams of monomethylol dimethyl hydantoin for each ten grams of polyvinyl alcohol was dissolved in the solution. The solution is stored in a stoppered container until film preparation is to be undertaken. Momomethylol dimethyl hydantoin (MDMH) is employed to further reduce the water solubility of the polyvinyl alcohol resin and minimize triaxial swelling of water soaked film prepared from these resins. This material (MDMH) can undergo reactions with the polyvinyl alcohol either as a substituted hydantoin, a formaldehyde donor or both. The formaldehyde which is liberated during the solution preparation and curing of the film reacts with polyvinyl alcohol to form cyclic formal groups. A small amount of polyvinyl formal thus produced tends to strengthen the polyvinyl alcohol structure and reduce the solubility of the product.

Films are prepared by casting the solution onto a suitable surface, such as for example a ferrotype plate, by using a doctor blade to control film thickness. The wet films are allowed to dry under infrared lamps, then cured in an oven at temperatures between 110° and 150° C. for thirty minutes. During the curing period the cross linking between the hydrolyzed poly(methyl vinyl ether/maleic anhydride) and polyvinyl alcohol is believed to occur. Also some of the monomethylol dimethyl hydantoin is believed to react to form resinous condensation products which in turn react with the polyvinyl alcohol to further insolubilize the film. However, in all of this, less than about 35% of the available hydroxyl groups of the polyvinyl alcohol are involved in the reactions.

The formed films are removed from the surface against which they were cast, soaked in water for about ten minutes, and then applied to glass surfaces which have been treated with an adhesive. A 5% by weight aqueous solution of Gantrez AN–119 is a suitable adhesive. It is brushed or wiped onto the precleaned glass surface. A piece of the wet film is then placed over the adhesive and the film is smoothed free of bubbles and excess adhesive. The film layer is heated above 110° C. for about ten minutes whereby the acid groups of the poly(methyl vinyl ether/maleic anhydride) react with the hydroxyl groups at the surface of the film of modified polyvinyl alcohol. In FIG. 1 of the drawing is shown an automobile 10 having a windshield 12. Bonded to the inside surface 14 of window glass 12 and coextensive therewith is the fog and frost resistant film 16. In FIG. 1 one corner of the film is shown pulled away from the window glass to demonstrate that the film is otherwise undetectable. The film 16 is shown in section in FIG. 2 bonded to the surface 14 of window glass 12. For purposes of illustration the thickness of the film is exaggerated in the drawing. For purposes of employment in combination with glass sheet windows the film is preferably about one mil thick.

The film thus prepared and bonded to the glass as described holds tenaciously thereto when dry. Only if the film is soaked with water for prolonged periods of time can it be easily removed from the glass. Even then, bond failure is observed to occur at the glass-adhesive interface. The film-glass laminate has excellent optical properties. Images are not distorted and the film is not readily discernible when it is coextensive with the surface of the glass. Window glass-film laminates prepared as described have been subjected to conditions of temperature and humidity under which fogging or frosting would normally be expected. Films resisted and prevented fog and frost formation under these conditions. Moreover, it was discovered that the films tended to be less prone to soiling than was the glass itself. Apparently this ability to resist soil was due in part to electrostatic charge dissipation of the films when subjected to the conditions of moderate to high relative humidity of the tests.

While the invention has been described in terms of a specific embodiment, it will be appreciated that other forms might readily be adapted by one skilled in the art and accordingly the scope of the invention should be considered limited only by the following claims.

I claim:
1. A window comprising a sheet glass body member and a transparent synthetic polymeric film adhering to a surface of said glass member which is exposed to the atmosphere and substantially coextensive therewith, said synthetic polymeric film consisting substantially of the reaction product of a major portion of a polyvinyl alcohol with a first minor portion of a material taken from the group consisting of poly(methyl vinyl ether/maleic anhydride) and esters of poly(methyl vinyl ether/maleic anhydride) and a second minor portion of monomethylol dimethyl hydantoin, the total of said first and second minor portions being an amount chemically equivalent to a small portion up to about 10% of the hydroxyl groups of said polyvinyl alcohol, said film being substantially insoluble in water and operable to sorb water molecules from the atmosphere under suitable conditions of temperature and relative humidity.

2. The article of claim 1 wherein the total of said first and second minor portions employed in forming said polymeric film is an amount chemically equivalent to a small portion up to about 35% of the hydroxyl groups in said polyvinyl alcohol.

References Cited

UNITED STATES PATENTS

| | | | |
|---|---|---|---|
| 2,143,482 | 1/1939 | Herrmann et al. | 161—199 |
| 2,321,989 | 6/1943 | Burke | 260—248 |
| 2,372,982 | 4/1945 | Richards | 117—6 |
| 2,441,470 | 5/1948 | Carswell | 117—138.8 |
| 2,443,923 | 6/1948 | Mortenson | 260—79 |
| 3,007,228 | 11/1961 | Matsubayashl et al. | 260—91.3X |
| 3,232,916 | 2/1966 | Fogle | 260—91.3 |
| 3,272,640 | 9/1966 | Geurden | 260—91.3X |

OTHER REFERENCES

British Plastics, February 1944, "Polyvinyl Alcohol—Part II, Jones, pp. 77–83 (copy in class 161—Polyvinyl Alcohol Digest).

JOHN T. GOOLKASIAN, Primary Examiner

D. J. FRITSCH, Assistant Examiner

U.S. Cl. X.R.

156—99; 161—204; 260—73, 91.3